United States Patent [19]
Takahashi et al.

[11] Patent Number: 5,949,208
[45] Date of Patent: Sep. 7, 1999

[54] CIRCUIT AND METHOD FOR CONTROLLING A DC MOTOR

[75] Inventors: Kuniyuki Takahashi, Musashimurayama; Hijiri Hayashi, Tokyo, both of Japan

[73] Assignee: Kabushiki Kaisha Shinkawa, Tokyo, Japan

[21] Appl. No.: 09/047,033

[22] Filed: Mar. 24, 1998

[51] Int. Cl.[6] .................................................. G05B 11/01
[52] U.S. Cl. .......................................... 318/560; 318/823
[58] Field of Search ..................................... 318/560, 811, 318/652, 823, 265, 264, 127, 199, 286, 369, 561; 388/632, 815; 360/73.03; 364/167

[56] References Cited

U.S. PATENT DOCUMENTS

| 4,262,239 | 4/1981 | Kawa ...................................... 318/561 |
| 4,578,748 | 3/1986 | Abe et al. ............................... 364/167 |

FOREIGN PATENT DOCUMENTS

| S53-44777 | 4/1978 | Japan . |
| S59-42324 | 10/1984 | Japan . |
| H6-61294 | 3/1994 | Japan . |

*Primary Examiner*—William M. Shoop, Jr.
*Assistant Examiner*—Rita Leykin
*Attorney, Agent, or Firm*—Koda & Androlia

[57] ABSTRACT

A circuit and method for controlling a rotating or oscillating element of a DC motor, including a positional deviation correction signal generator in addition to a position sensor which detects an amount of rotation or oscillation and position of the rotating or oscillating element, a main control circuit that includes a DC motor driving circuit, and a computer which controls the main control circuit. The output signal of the positional deviation correction signal generator is controlled by the computer based upon positional deviation correction information and signals from the position sensor, so that the positional deviation correction signal generator compensates for any positional deviation of the rotating or oscillating element of the DC motor at a stopping position thereof.

3 Claims, 2 Drawing Sheets

CIRCUIT AND METHOD FOR CONTROLLING A DC MOTOR

BACKGROUND OF THE INVENTION

1. Field of the Invention

The present invention relates to a DC motor controller and more particularly to a circuit and method for controlling the moving element of a DC motor.

2. Prior Art

Generally, there are two types of DC motors: a rotary type DC motor in which a moving element thereof, such as a motor shaft, rotates; and a linear type DC motor in which a moving element thereof oscillates.

A conventional circuit for controlling the position of the moving elements of DC motors is shown in FIG. 2. The "control" of a DC motor includes not only a position control of the moving element such as a motor shaft thereof, but also other types of control such as speed control, etc.; however, only the position control will be described below.

Position control of a DC motor 1 is accomplished by a circuit that includes a position sensor 2 which reads the position of the rotating or oscillating element of the DC motor 1, a main control circuit 10 which includes a driving circuit for the DC motor 1, and a computer 3 which controls the main control circuit 10. The main control circuit 10 includes an UP/DOWN counter 11, an adder 12, an amplifier 13, a driver 14 and an encoder 15.

Pulse sequence commands from the computer 3 constitute single position commands by being inputted into one of the terminals of the UP/DOWN counter 11. In other words, when a pulse sequence is input into one terminal, the counter 11 counts UP; and when a pulse sequence is inputted into the other terminal, then the counter 11 counts DOWN. Here, the density of the pulse sequence represents the speed. When such a pulse sequence is inputted into the UP/DOWN counter 11, the number of pulses is counted; as a result, the content of position signal 16 is added by the adder 12 and converted into positional information. Afterward, this positional information is converted by the amplifier 13 into a signal waveform which is suitable for driving the DC motor 1, and a fixed gain is applied, thus producing a current command which is used to drive the DC motor 1 via the driver 14.

The movement (rotation or oscillation) of the moving element of the DC motor 1 (only a rotational movement of moving elements will be descried below) driven by the current command is detected by the position sensor 2, and the output of the position sensor 2 is converted by the encoder 15 into pulse signals 17 and 18 which are indicative of pulses and positions between pulses. The pulse signal 17 is fed back to the UP input of the UP/DOWN counter 11, and the pulse signal 18 is fed back to the DOWN input of the UP/DOWN counter 11. In other words, the UP/DOWN counter 11 initiates an output from the time that a position command is inputted, and it continues to output a deviation until the DC motor 1 rotates so that a number of pulses which is the same as the number of pulses of the position command returns from the encoder 15. When the same number of pulses has returned, the deviation becomes zero, which is an indication that the operation is completed.

When the position sensor 2 has a sine wave output, two sine waves which are shifted 90 degrees in phase are outputted as shown in FIGS. 3(a) and 3(b) and FIGS. 4(a) and 4(b). The position and direction of the moving element, a motor shaft, of the DC motor 1 are ascertained from these waveforms. The encoder 15 generates a forward-rotation pulse signal 17 as shown in FIGS. 3(c) and 3(d) or a reverse-rotation pulse signal 18 as shown in FIGS. 4(c) and 4(d), from the waveforms. Furthermore, the pulse waveforms are ordinarily generated by quadrupling the encoder waveform (thus creating a waveform with ¼ the period of the original waveform).

In order to stop the DC motor 1 at a fixed position between pulses, the sawtooth-form position signal 16 as shown in FIG. 3(e) or FIG. 4(e) is further generated from the encoder 15 and is fed back to the adder 12. The position signal 16 is produced by converting the interval (amount of movement) from one pulse to the next pulse into an electrical quantity and is generated using the sine wave outputs (the output of the position sensor 2) shown in FIGS. 3(a) and 3(b) and FIGS. 4(a) and 4(b).

Ordinarily, the DC motor 1 is stopped at the center point between pulses; accordingly, as shown in FIG. 3(e) and FIG. 4(e), when the position signal 16 is expressed as a voltage, the interval from the rise of one pulse to the rise of the next pulse is expressed as "V", and the center point is expressed as 0 V. For instance, when the motor is actuated from a stopped state with the position signal 16 assumed to be 0 V, and the position in which the motor is stopped following this actuation is not a position that corresponds to 0 V, then a voltage corresponding to the deviation is fed back to the adder 12, and the output of the adder 12 is corrected so that the position signal 16 returns to the position of 0 V, thus stopping the motor in a fixed position.

The position signal 16 shown in FIG. 3(e) corresponds to the state obtained when the DC motor 1 is actuated in one direction, while the position signal 16 shown in FIG. 4(e) corresponds to the state obtained when the DC motor 1 is actuated in another direction.

In the DC motor position control circuit (that is, in the circuit for controlling the position of the rotating or oscillating element of a DC motor), when there is no command from the computer 3, there is naturally no change in the output of the UP/DOWN counter 11; accordingly, the DC motor 1 should stop at the center point between pulses. In actuality, however, the electronic parts such as the amplifier 13, etc. in the main control circuit 10 have offset characteristics in which the output of such parts is not always zero when there is an input of zero. Because of these offset characteristics, when the DC motor is driven, a position of the moving element which is different from the original position becomes the stopping position. When the fluctuation in output caused by these offset characteristics is small, the result is merely a state in which the stopping position of the motor between pulses is not centered between the pulses. However, in cases where the fluctuation in output is large, then a positional deviation that exceeds one pulse may be generated.

Accordingly, in order to cancel the offset characteristics generated in the main control circuit 10, an offset adjustment circuit 4 is used. The offset adjustment circuit 4 generates an electrical quantity corresponding to the amount of deviation and then adds this quantity, thus aligning the stopping position with the center point between pulses. The main control circuit 10 is adjusted, as an initial adjustment at the time of manufacturing, so that the amount of positional deviation is within one pulse. After the DC motor 1 and main control circuit 10 have been installed in apparatuses, an adjustment to within one pulse (i. e., an adjustment which causes the motor to stop at the center point between pulses) is performed.

The output of the position signal 16 in the stopped state in which this position control is performed is measured, and the offset adjustment circuit 4 is adjusted so that this output becomes 0 V. As a result, the stopping position is fixed to be the center point between pulses. Furthermore, there may be cases in which the offset characteristics vary as a result of variations in the main control circuit 10 over time; accordingly, the condition of the stopping position is monitored at fixed intervals following the offset adjustment; and when a positional deviation occurs as a result of fluctuations in the offset characteristics, then the adjustment is performed again.

Examples of DC motor position control circuits of this type are described in Japanese Examined Patent Application Publication (Kokai) Nos. S53-44777 and H6-61294 and Japanese Patent Application Examined Publication (Kokoku) No. S59-42324, etc.

In the offset adjustment performed using the conventional method above, the offset adjustment circuit 4 is adjusted while the position signal 16 is monitored by a measuring device in the stopped state in which position control is performed. As a result, skill is required in order to perform this offset adjustment, so that the adjustment cannot be easily performed. Furthermore, if the amplifier 13, driver 14, etc. are used as unit parts, an offset adjustment must be performed each time these unit parts are replaced for purposes of maintenance or repair; accordingly, the time required for repairs increases.

SUMMARY OF THE INVENTION

Accordingly, the object of the present invention is to provide a circuit and method for controlling the position of a rotating or oscillating element of a DC motor (rotary type and oscillation type) which performs the offset adjustment automatically.

The position control circuit for a moving (rotating or oscillating) element of a DC motor of the present invention includes a position sensor for detecting the amount of rotation or oscillation and position of the moving element of a DC motor, a main control circuit having a DC motor driving circuit, and a computer for controlling the main control circuit, so that the position control circuit controls the amount of rotation or oscillation and position of the moving element of the DC motor by means of signals from the position sensor, wherein the motor position control circuit further includes a positional deviation correction signal generator which compensates for any positional deviation of the moving element of the DC motor in the stopping position, and the output signal of the positional deviation correction signal generator is controlled by the computer on the basis of positional deviation information and signals from the position sensor.

The position control method of a DC motor of the present invention is performed by a system that includes a position sensor for detecting the amount of rotation or oscillation and position of the moving element of a DC motor, a main control circuit having a DC motor driving circuit, and a computer for controlling the control circuit, thus controlling the amount of rotation or oscillation and position of the moving element of the DC motor by means of signals from the position sensor, and in this method a positional deviation correction signal generator is utilized so as to control the output signal of the positional deviation correction signal generator by the computer on the basis of positional deviation information and signals from the position sensor, thus compensating for any positional deviation of the moving of the DC motor in the stopping position thereof.

BRIEF DESCRIPTION OF THE DRAWINGS

FIGS. 4(a) and 4(b) are waveform diagrams of the output of the position sensor.

DETAILED DESCRIPTION OF THE INVENTION

Figure 1:
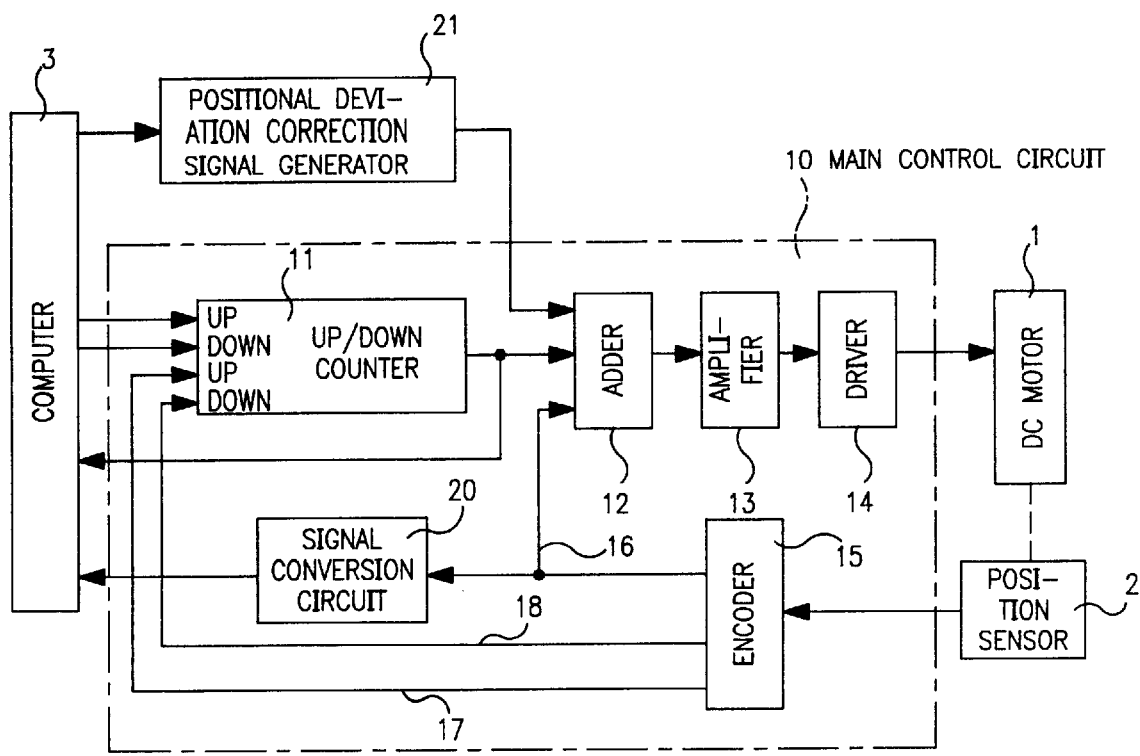
FIG. 1 is a block diagram illustrating one embodiment of the position control circuit for a DC motor according to the present invention.
Figure 2:
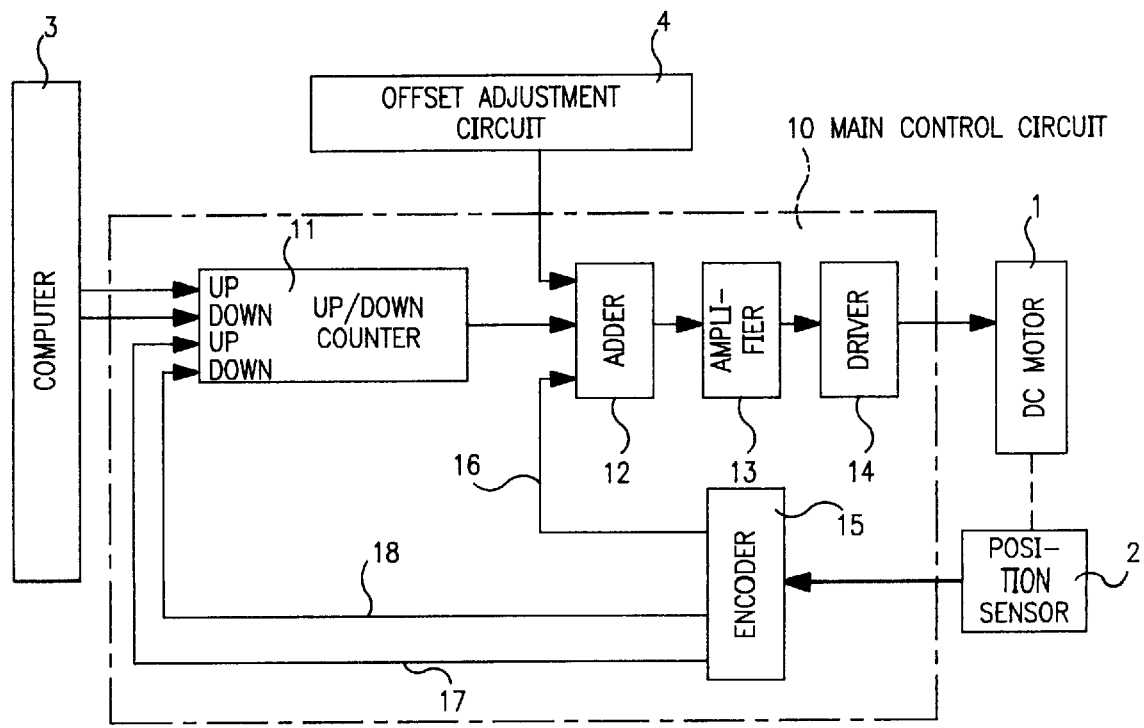
FIG. 2 is a block diagram illustrating a conventional position control circuit.
Figure 3:
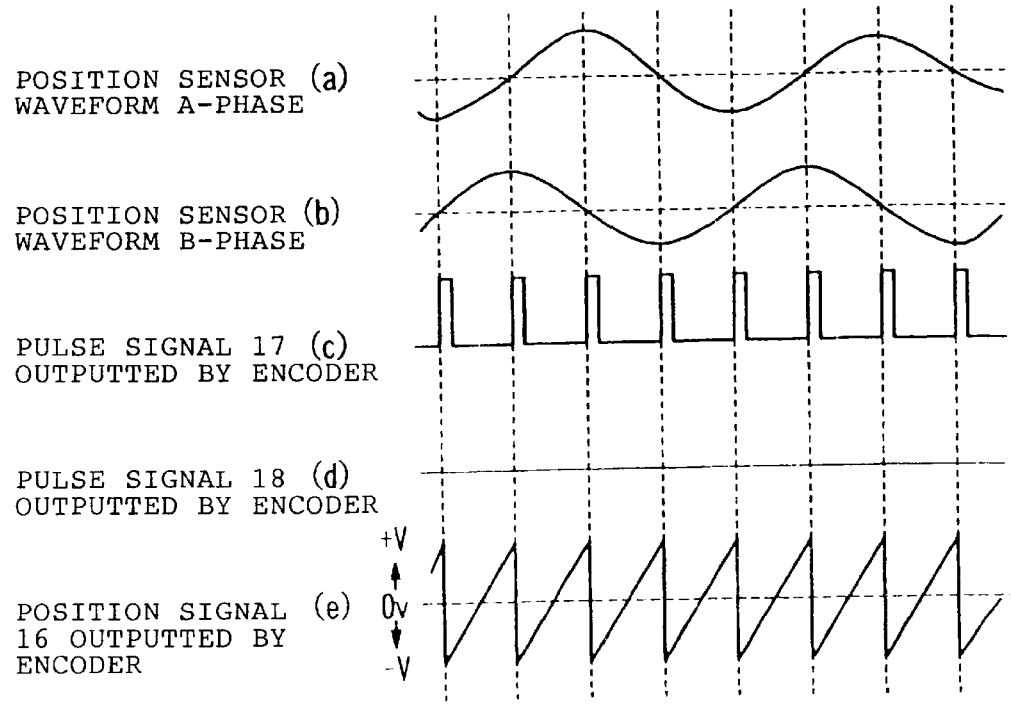
FIGS. 3(a) and (b) are waveform diagrams of the output of the position sensor.
FIGS. 3(c), 3(d) and 3(e) are diagrams of the encoder output.
Figure 4:
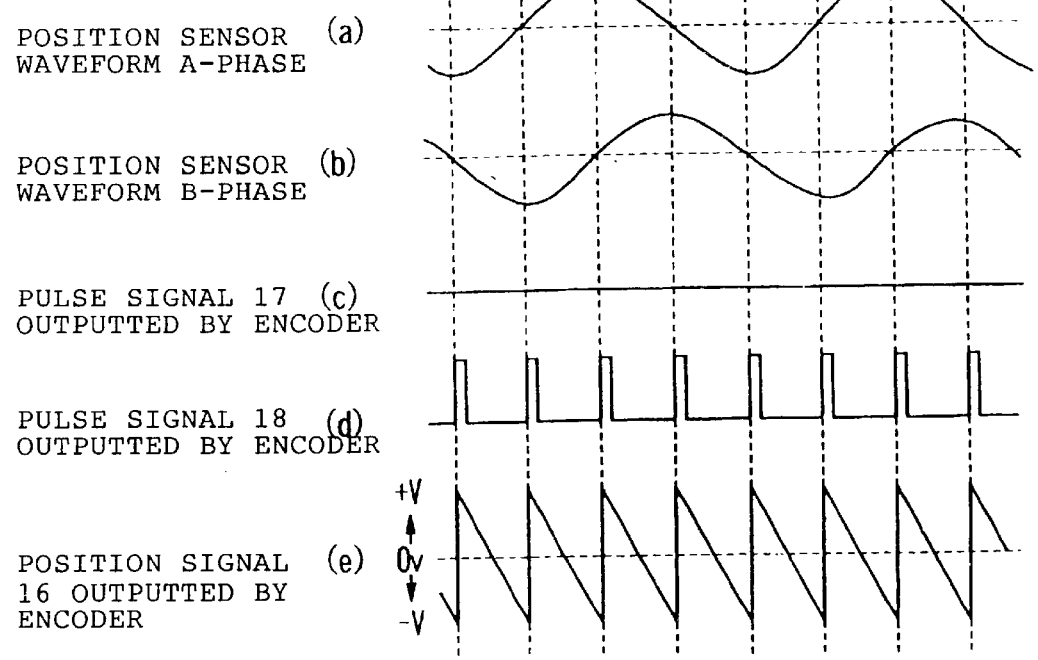
FIGS. 4 (c), 4(d) and 4(e) are diagrams of the encoder output.

An embodiment of the present invention will be described with reference to FIG. 1 and to a rotary type DC motor that includes a motor shaft as a moving element. Elements which are the same as in FIG. 2 or correspond to those in FIG. 2 are labeled with the same symbols, and a detailed description of such elements is omitted.

The position control circuit of the present invention includes a signal conversion circuit 20 and a positional deviation correction signal generator 21 in addition to a position sensor 2 which reads the position of the rotating shaft of a DC motor 1, a main control circuit 10 which includes a driving circuit for the DC motor 1, and a computer 3 which controls the main control circuit 10. The main control circuit 10 includes an UP/DOWN counter 11, an adder 12, an amplifier 13, a driver 14 and an encoder 15.

The computer 3 is configured so as to read the content of the UP/DOWN counter 11; and, in order to read the positions between the pulses shown by the position signal 16 outputted from the encoder 15, the position signal 16 is converted by the signal conversion circuit 20 into a format that can be read by the computer 3 and is inputted into the computer 3 with sufficient precision. The signal conversion circuit 20 is provided between the encoder 15 and the computer 3. The positional deviation correction signal generator 21 is provided between the adder 12 and computer 3 so that a positional deviation correction signal outputted to the adder 12 by this positional deviation correction signal generator 21 is controlled by the computer 3. Thus, in the circuit of the present invention, the offset adjustment circuit 4 is not employed.

With the arrangement above, in the stopped state in which position control is performed, the computer 3 reads the content of the UP/DOWN counter 11 and thus ascertains whether or not a deviation exceeding one pulse has been generated as a result of the offset characteristics. If the reading of the value shown by the UP/DOWN counter 11 is not zero, the computer 3 controls the positional deviation correction signal generator 21 so that the positional deviation correction signal generator 21 outputs a positional deviation correction signal to the adder 12 which causes the content of the UP/DOWN counter 11 to become zero.

When the content of the UP/DOWN counter 11 becomes zero, and the positional deviation is within one pulse, then the position signal 16 outputted by the encoder 15 is read in by the signal conversion circuit 20. As a result, if it is ascertained that a positional deviation has occurred (i. e., if the position signal 16 is not 0 V), then the computer 3 controls the positional deviation correction signal generator 21 so that the positional deviation correction signal generator 21 outputs a positional deviation correction signal so that the position signal 16 becomes zero, and this information is added to the content of the UP/DOWN counter 11. The setting value of the positional deviation correction signal generator 21 in this case is stored by the computer 3; and during subsequent actuation of the DC motor 1, the computer 3 regularly outputs this setting value to the positional deviation correction signal generator 21.

Thus, by performing the above-described operation each time that the DC motor is actuated or at fixed intervals, it is possible to eliminate the occurrence of positional deviations caused by the offset characteristics and fluctuations in the stopping position between pulses accompanying fluctuations in the offset characteristics over time.

The description above is made for a rotary type DC motor that includes a rotating motor shaft; however, the present invention is not limited to this type of DC motor and is applicable to a DC motor of a linear type in which a moving element oscillates.

As seen from the above, in the present invention, a positional deviation correction signal generator is provided which compensates for positional deviations in the stopping position of the moving (rotating or oscillating) element of a DC motor, and the output signal of the positional deviation correction signal generator is controlled by computer based upon positional deviation correction information stored in the computer and signals from a position sensor. Accordingly, offset adjustment can be performed automatically.

We claim:

1. A position control circuit for controlling a position of a moving element of a DC motor, said position control circuit comprising a position sensor which detects an amount of movement and position of said moving element of said DC motor, a main control circuit which includes a DC motor driving circuit, and a computer coupled to said position sensor, said computer controls said main control circuit for controlling a position of said moving element of said DC motor by means of signals from said position sensor, wherein said position control circuit further comprises a positional deviation correction signal generator which compensates for any positional deviation of said moving element in a stopping position thereof, and an output signal of said positional deviation correction signal generator is controlled by said computer based upon positional deviation information and signals from said position sensor.

2. A method for controlling a position of a moving element of a DC motor, said method comprising: detecting an amount of movement and position of said moving element with a position sensor coupled to said DC motor and, controlling a position of said moving element in response to signals from said position sensor by means of a main control circuit which includes a DC motor driving circuit and a computer coupled to said position sensor, said computer controls said main control circuit, said method further comprising the steps of controlling output signals of a position deviation correction signal generator by means of said computer in response to positional deviation information and said signals from said position sensor and compensating for positional deviation at a stopping position of said moving element of said DC motor in response to said output signals of said positional deviation correction signal generator.

3. A position control circuit for controlling a position of a moving element of a DC motor, said circuit comprising:
   an up/down counter;
   a DC motor driver coupled to an output of said up/down counter;
   a DC motor driven by an output of said DC motor driver;
   a position sensor coupled to said DC motor for sensing a position of a moving element as an output signal, said output signal being coupled to an input of said up/down counter;
   a computer which provides position control signals to said up/down counter and receives said output signal of said position sensor and an output of said up/down counter; and
   a position deviation correction signal generator coupled to said DC motor driver circuit and controlled by said computer for causing said moving element to be moved by said DC motor until said computer determines that an output of said up/down counter is less than a predetermined value to thereby eliminate positional errors.

* * * * *

UNITED STATES PATENT AND TRADEMARK OFFICE
CERTIFICATE OF CORRECTION

PATENT NO. : 5,949,208
DATED : September 7, 1999
INVENTOR(S) : Kuniyuki Takahashi, et al.

It is certified that error appears in the above-indentified patent and that said Letters Patent is hereby corrected as shown below:

Title page, insert--
Item [30] Foreign Application Priority Data:

Add --March 24, 1997  [JP]  Japan ....... 9-87203--

Signed and Sealed this

Seventh Day of March, 2000

Attest:

Q. TODD DICKINSON

*Attesting Officer*   *Commissioner of Patents and Trademarks*